(12) United States Patent
Chen (10) Patent No.: US 7,808,238 B2
(45) Date of Patent: Oct. 5, 2010

(54) ECHO-DECAY-ACCELERATION DATA ACQUISITION METHOD FOR GAS IDENTIFICATION USING A LOW-FIELD GRADIENT

(75) Inventor: Songhua Chen, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 311 days.

(21) Appl. No.: 12/034,469

(22) Filed: Feb. 20, 2008

(65) Prior Publication Data

US 2009/0210159 A1 Aug. 20, 2009

(51) Int. Cl.
*G01V 3/00* (2006.01)
(52) U.S. Cl. ........................ 324/303; 324/306
(58) Field of Classification Search ................ 324/303, 324/306
See application file for complete search history.

(56) References Cited

U.S. PATENT DOCUMENTS

| | | | |
|---|---|---|---|
| 5,498,960 A | 3/1996 | Vinegar et al. | |
| 6,069,477 A | 5/2000 | Chen et al. | |
| 6,163,153 A | 12/2000 | Reiderman et al. | |
| 6,348,792 B1 | 2/2002 | Beard et al. | |
| 6,445,180 B1 | 9/2002 | Reiderman et al. | |
| 6,452,388 B1 | 9/2002 | Reiderman et al. | |
| 6,466,013 B1 | 10/2002 | Hawkes et al. | |
| 6,570,382 B1 | 5/2003 | Hurlimann et al. | |
| 6,650,114 B2 | 11/2003 | Kruspe et al. | |
| 6,867,589 B2 * | 3/2005 | Heaton ................. | 324/303 |
| 6,891,369 B2 * | 5/2005 | Hurlimann et al. ........ | 324/303 |
| 7,164,267 B2 * | 1/2007 | Prammer et al. ......... | 324/303 |
| 7,176,682 B2 * | 2/2007 | Galford et al. ........... | 324/303 |
| 7,298,142 B2 | 11/2007 | Hursan et al. | |

OTHER PUBLICATIONS

Fukushima et al.; Experimental Pulse NMR: A Nuts and Bolt Approach, Addison-Wesley Publishing Company, Inc., Advanced Book Program, 1981, pp. 168-176.

* cited by examiner

*Primary Examiner*—Louis M Arana
(74) *Attorney, Agent, or Firm*—Mossman Kumar & Tyler PC (57) ABSTRACT

A first NMR echo train is acquired with a single TE. A second NMR echo train is acquired with a first portion having the same TE and the second portion having a longer TE. When measurements are made with a low magnetic field gradient, processing the two echo trains can be used to determine gas in the formation.

21 Claims, 3 Drawing Sheets

ECHO-DECAY-ACCELERATION DATA ACQUISITION METHOD FOR GAS IDENTIFICATION USING A LOW-FIELD GRADIENT

BACKGROUND OF THE INVENTION

1. Field of the Invention

The present disclosure relates to a method of identifying gas in geological formations and is particularly related to identifying gas from Nuclear Magnetic Resonance (NMR) data obtained in a region of low magnetic field gradient in a geological formation.

2. Description of the Related Art

Oil or gas wells are often surveyed to determine one or more geological, petrophysical, geophysical, and well production properties ("parameters of interest") using electronic measuring instruments conveyed into the borehole by an umbilical such as a cable, a wireline, slickline, drill pipe or coiled tubing. A variety of techniques are utilized in determining the presence and estimation of quantities of hydrocarbons (oil and gas) in earth formations. These methods are designed to determine among other things, the resistivity, porosity and permeability of the rock formation surrounding the wellbore drilled for recovering the hydrocarbons. Typically, the tools designed to provide the desired information are used to log the wellbore. More recently, wellbores have been logged while drilling, which is referred to as measurement-while-drilling (MWD) or logging-while-drilling (LWD).

One recently evolving technique involves utilizing Nuclear Magnetic Resonance (NMR) logging tools and methods for determining, among other things, porosity, hydrocarbon saturation and permeability of the rock formations. The NMR logging tools are utilized to excite the nuclei of the liquids in the geological formations surrounding the wellbore so that certain parameters such as spin density, longitudinal relaxation time (generally referred to in the art as $T_1$) and transverse relaxation time (generally referred to as $T_2$) of the geological formations can be measured. From such measurements, porosity, permeability and hydrocarbon saturation are determined. These quantities provide valuable information about the make-up of the geological formations and the amount of extractable hydrocarbons.

NMR tools generate a uniform or near uniform static magnetic field in a region of interest surrounding the wellbore. NMR operates based on the fact that the nuclei of many elements have angular momentum (spin) and a magnetic moment. The nuclei have a characteristic Larmor resonant frequency related to the magnitude of the magnetic field in their locality. Over time the nuclear spins align themselves along an externally applied magnetic field. This equilibrium situation can be disturbed by a pulse of an oscillating magnetic field, which tips the spins with resonant frequency within the bandwidth of the oscillating magnetic field away from the static field direction. For spins that are exactly on resonance, the angle θ through which the spins are tipped is given by the equation:

$$\theta = \gamma B_1 t_p. \quad (1)$$

where γ is the gyromagnetic ratio, $B_1$ is the effective field strength of the oscillating field and $t_p$ is the duration of the RF pulse.

After tipping, the spins precess around the static field at a particular frequency known as the Larmor frequency $\omega_0$, given by $$\omega = \gamma B_0 \quad (2)$$

where $B_0$ is the static field intensity. At the same time, the spins return to the equilibrium direction (i.e., aligned with the static field) according to an exponential decay time known as the spin-lattice relaxation time, or longitudinal relaxation time, $T_1$. For hydrogen nuclei, $\gamma/2\pi$=4258 Hz/Gauss, so that a static field of 235 Gauss produces a precession frequency of 1 MHz. The $T_1$ of fluid in pores is controlled totally by the molecular environment and is typically ten to one thousand milliseconds in rocks.

Typically, measurement of NMR-related phenomena in the earth formation is performed by allowing some time for the static magnetic field to polarize nuclei in the formation in a direction substantially along the direction of the static magnetic field. A first one of the radio frequency (RF) pulses passed through the antenna has a magnitude and duration selected to reorient the nuclear magnetization by about 90 degrees from its previous orientation. This pulse is referred to in the prior art as the π/2-pulse, the 90°-pulse, and the excitation pulse, among others. After a selected wait time (TW), successive RF pulses are passed through the antenna, each of these having a magnitude and duration selected to reorient the nuclear spin axes by about 180 degrees from their immediately previous orientations in order to enable the nuclear spin axes to "rephase" or realign with each other. These rephasing pulses are referred to in the prior art as the B-pulses, the 180°-pulses, π-pulses, and refocusing pulses, among others. The induced signals, known as "spin echoes", are generally measured during the time interval between each successive one of the "180 degree" RF pulses. The succession of spin echo measurements is generally known as a "sequence". The amplitude of the spin echo signals, and the rate at which the spin echo amplitudes change during a measurement sequence, are related to properties of interest of the earth formations, such as fractional volume of pore space (porosity) and the properties of fluids present in the pore spaces. The frequency of the RF magnetic field needed to reorient the nuclear magnetization, which is the frequency of the spin echo signals, is related to the amplitude of the static magnetic field and a factor, known as the gyromagnetic ratio γ, which is unique to each isotope. For evaluation of earth formations, the static magnetic field amplitude and RF magnetic field frequency are typically selected to excite NMR phenomena in hydrogen nuclei, although other nuclei may be used for NMR evaluation of earth formations.

A standard sequence of RF pulses used to measure the true transversal relaxation (not related to the macroscopic inhomogeneity of the static magnetic field) is the Carr-Purcell-Meiboom-Gill (CPMG) sequence. The CPMG sequence is described, for instance, in *Experimental Pulse NMR: A Nuts and Bolts Approach* by E. Fukushima, S. B. W. Roeder. This sequence comprises a first excitation RF pulse (π/2 pulse) that tilts the magnetization from a Z-axis into the X-Y plane followed by a plurality of refocusing RF pulses (π pulses). The period of repetition of the plurality of the refocusing pulses is twice the length of time between the center of the excitation pulse and the center of the first refocusing pulse. The spin echo signal, which results from refocusing the spin isochromats, appears between refocusing pulses. The amplitudes of the echoes represent points on a $T_2$ relaxation curve. This curve is then decomposable into exponential terms in order to differentiate between the types of substances present and/or, in the case of a fluid trapped in a porous structure, to characterize the porous media.

The CPMG sequence uses a 90° tipping pulse followed by a plurality of 180° refocusing pulses. Similar results may be obtained by using refocusing pulses having a tipping angle in the range from 135° to 180°. See U.S. Pat. No. 6,466,013 to Hawkes et al., and U.S. Pat. No. 6,163,153 to Reiderman, both having the same assignee as the present disclosure. The pulse sequence described therein may be referred to as the Optimal Rephasing Pulse Sequence (ORPS).

It is difficult to identify and estimate gas quantities using a standard CPMG sequence due to the relative strengths of the signals of liquid and gas phases. Prior methods of NMR based hydrocarbon gas identification are based on one of two approaches. The first approach utilizes two or more wait times (TW) to elicit a contrast in polarization between the liquid phase fluids and the hydrocarbon gas. This method relies on the longitudinal relaxation time $T_1$ being different between gas and liquids as well as a proper selection of TW parameters. A typical realization of this method is described in U.S. Pat. No. 5,498,960, by Vinegar et al. This method is limited in that the formation does not generally contain slowly relaxing liquids such that the polarization contrast between liquid and gas is adequate. Low-viscosity oil and water in carbonate rocks may have long $T_1$ values comparable to that of gas, thereby invalidating an approach based on polarization contrast.

The second approach is based on determining the diffusion contrast between gas and liquid phases. A magnetic field gradient is typically used to elicit the diffusion contrast, since the fluid NMR signal decay contrast depends on $$\exp\left(-\frac{t}{T_{2D}}\right) \qquad (3)$$

where $$\frac{1}{T_{2D}} = \frac{\gamma^2 \cdot G^2 \cdot TE^2 \cdot D}{12}, \qquad (4)$$

where $\gamma$ is the gyromagnetic ratio of the nucleus being measured, G is the magnetic field gradient, TE is the data acquisition sequence parameter called interecho time, and D is the diffusivity of the fluid. The selection of the combination of G and TE is critical to the discernment of the liquids and gas. The strength of the field gradient is often determined by the design of the magnetic field configuration, and the operating frequencies thus are substantially limited to vary. Although conceptually it is possible to select a long TE value to compensate for a low field gradient, in practice, the longer TE selection is also known to be limited. Long TE reduces the echo train sampling rate and is detrimental to fast relaxing components, especially for those with $T_2$ smaller than or comparable to TE. Thus the long TE echo train may result in large uncertainty in estimations of porosity, Clay Bound Water (CBW), and Bulk Volume Irreducible (BVI), for example.

More recently a combination of the $T_1$ vs. apparent $T_2$ method has been used for gas identification. U.S. Pat. No. 7,298,142 to Hursan et al. and assigned to Baker Hughes Incorporated describes the method of using a $T_1/T_{2app}$ ratio for gas identification. This method utilizes a contrast between the intrinsic relaxation time and the apparent relaxation time. However, since the apparent relaxation time is $$\frac{1}{T_{2app}} = \frac{1}{T_{2intr}} + \frac{1}{T_{2D}} \approx \frac{1}{T_1} + \frac{1}{T_{2D}} \qquad (3)$$

the method still relies on the presence of an adequate gradient strength.

An NMR logging tool includes a magnet that generates a static magnetic field in a sensitive volume of an earth formation to align nuclear spins within. Depending on the configuration and geometry of the magnet, the corresponding magnetic field in the sensitive volume may either be nearly uniform, or have a linear or non-linear gradient. This gradient can be calculated, and its effect on the data interpretation can be accounted for quantitatively.

For an NMR logging tool positioned inside a wellbore, the static magnetic field penetrates to the porous rock formation and also produces magnetization. A formation rock typically contains matrix and a fluid (liquid or gas) occupying the pore space within the matrix. The minerals of the matrix have a magnetic susceptibility of $\chi_m$ which may be different from that of the fluids, $\chi_f$. Thus, at the interface of the matrix and the fluid, an "internal field gradient", arising from the magnetic field susceptibility difference, occurs, as shown in Eq. (5):

$$G_{int} = \frac{(\chi_m - \chi_f) \cdot H}{r} = \frac{\Delta \chi \cdot H}{r}. \qquad (5)$$

The magnitude of the internal field gradient varies from one point to another in the pore space, and is dependent on the magnetic field strength, H, and the curvature, 1/r, at the interface. Because of the heterogeneity in rock minerals and pore geometry, neither $\chi_m$ nor r can be well estimated, leaving a great uncertainty in the value of $G_{int}$. Therefore, the effect of $G_{int}$ on NMR logging data interpretation may not be well accounted for.

A magnetic field gradient affects NMR measurements by increasing the spin dephasing, thereby resulting in the enhancement of free-induction decay, spin-echo or echo train decay. In an CPMG echo train, for example, the enhancement of echo train decay can be described as an introduction of an additional decay rate, $$\frac{1}{T_{2D}} = \frac{(\gamma \cdot G \cdot TE)^2 \cdot D}{12} \qquad (6)$$

where $\gamma$ is the gyromagnetic ratio, G is the magnetic field gradient which includes both the NMR instrument designed gradient and the internal field gradient, and TE is the echo spacing. The diffusivity, D, is a fluid property.

The uncertainty of $G_{int}$ introduces uncertainty in $T_{2D}$, resulting in mainly two detrimental effects on NMR log data analysis. Firstly, the uncertainty arising from $G_{int}$ results in an uncertain relation between $T_{2int}$ and $T_{2app}$ and therefore in uncertainty of formation pore size distribution estimate. The relation between $T_{2int}$ and $T_{2app}$ is:

$$\frac{1}{T_{2int}} = \frac{1}{T_{2app}} - \frac{1}{T_{2D}}. \qquad (7)$$

Since NMR-based pore size distribution analysis is based on intrinsic relaxation time distribution $T_{2int}$, but the measured echo decay corresponds to apparent relaxation time distribution $T_{2app}$, any uncertainty arising from $G_{int}$ results in uncertainty in the formation pore size distribution. Secondly, the uncertainty of $G_{int}$ leads to error in fluid identification and/or property analysis, since discerning different fluid types often is performed by contrasting their $T_{2int}$ or $T_{2D}$ or both.

The effect of $T_{2D}$ on the value of $T_{2int}$ can be reduced by making TE small. On the other hand, if one relies on the diffusivity contrast for fluid typing, one is not interested in reducing the TE to minimize the diffusion contrast in echo decay. Thus, there is a need for a method of identifying a gas saturation using NMR sequences in low-field gradients.

SUMMARY OF THE DISCLOSURE

In one aspect the present disclosure provides a method of method of determining a parameter of interest of a gas in a volume of an earth formation penetrated by a borehole. The method includes pulsing an NMR logging tool in the borehole with a first pulse sequence comprising a tipping pulse and a plurality of refocusing pulses spaced apart by a time interval TEs to obtain a first echo train; pulsing the NMR logging tool with a second pulse sequence comprising a tipping pulse and a plurality of refocusing pulses, an earlier subset of the plurality of refocusing pulses spaced apart by TEs and a latter subset of the refocusing pulses spaced apart by TEl, wherein TEl>TEs, to obtain a second echo train; processing the first echo train and the second echo train to estimate value of a gas saturation of the formation; and recording the estimated value on a suitable medium. In one aspect of the method, at least one of the refocusing pulses has a tipping angle of less than 180°.

The method may include obtaining the first and second NMR echo trains from a region of low magnetic field gradient in the formation.

In one aspect, a value of $G \cdot TE_L$ is selected to enable distinguishing gas from liquids based on diffusion techniques, where G is the field gradient of an applied magnetic field. In another aspect, the duration of the earlier subset of pulses is selected such that NMR echoes related to Bound Water Volume are substantially decayed at the end of the earlier subset of pulses and NMR echoes related to gas saturation are intact. The earlier subset of the second echo train may be averaged with a portion of the first echo train corresponding to the earlier subset of the second echo train.

The method may further include inverting the first echo train to obtain a T2 distribution, using a portion of the obtained T2 distribution to simulate a third echo train having a length substantially equal to the subset of the second echo train, subtracting the third echo train from the second echo train, and inverting the results of the subtraction to provide an estimate of a T2 distribution of the gas.

In another aspect, the present disclosure provides an NMR logging tool conveyed in a borehole penetrating an earth formation for determining a parameter of interest of a gas in a volume of the earth formation. The NMR logging tool includes an antenna configured to provide a first pulse sequence comprising a tipping pulse and a plurality of refocusing pulses spaced apart by a time interval TES to obtain a first echo train and a second pulse sequence comprising a tipping pulse and a plurality of refocusing pulses, an earlier subset of the plurality of refocusing pulses spaced apart by TES and a latter subset of the refocusing pulses spaced apart by TEL, wherein TEL>TES, to obtain a second echo train; a receiver configured to measure the first and second echo trains; and a processor configured to: (i) estimate from the first echo train and the second echo train a value of a gas saturation of the formation; and (ii) record the estimated value on a suitable medium. In one aspect, at least one of the refocusing pulses has a tipping angle of less than 180°.

The receiver may be further configured to obtain the first and second NMR echo trains from a region of low magnetic field gradient in the formation. The receiver may be further configured to obtain the first and second echo trains from one of: (i) a region near the borehole using a low-gradient NMR tool, and (ii) a region far from the borehole using a high-gradient NMR tool. Where the first and second echo trains are measured from a wetting phase fluid in a magnetic field gradient, the processor may further be configured to select the first and second pulse sequences to reduce the effect of the magnetic field gradient on the obtained first and second echo trains.

The processor may be further configured to select a value of $G \cdot TE_L$ that enables distinguishing gas from liquids based on diffusion techniques, where G is the field gradient of an applied magnetic field. The processor may be further configured to select a duration of the earlier subset of pulses such that echoes related to Bound Water Volume are substantially decayed at the end of the earlier subset of pulses and echoes related to gas saturation are intact. The processor may be further configured to average the earlier subset of the second echo train and a portion of the first echo train corresponding to the earlier subset of the second echo train. In one aspect, the processor may be configured to invert the first echo train to obtain a T2 distribution, use a portion of the obtained T2 distribution to simulate a third echo train having a length substantially equal to the subset of the second echo train, subtract the third echo train from the second echo train, and invert the results of the subtraction to provide an estimate of a T2 distribution of the gas.

The NMR logging tool may be configured to be conveyed into the borehole on a bottomhole assembly conveyed on a drillstring or a logging string conveyed on a wireline.

In another aspect, the present disclosure provides a computer-readable medium for use with an apparatus for determining a parameter of interest of a gas in a volume of earth formation. The apparatus includes an antenna configured to provide a first pulse sequence comprising a tipping pulse and a plurality of refocusing pulses spaced apart by a time interval TEs to obtain a first echo train and a second pulse sequence comprising a tipping pulse and a plurality of refocusing pulses, an earlier subset of the plurality of refocusing pulses spaced apart by $TE_S$ and a latter subset of the refocusing pulses spaced apart by $TE_L$, wherein $TE_L > TE_S$, to obtain a second echo train; and a receiver configured to measure the first and second echo trains. The medium comprising instructions which when executed by a processor enable the processor to process the first echo train and the second echo train to estimate value of a gas saturation of the formation; and record the estimated value on a suitable medium. The medium may include at least one of (i) a ROM, (ii) a CD-ROM, (iii) an EPROM, (iv) an EAROM, (v) a flash memory, and (vi) an optical disk.

BRIEF DESCRIPTION OF THE DRAWINGS

The present invention is best understood with reference to the accompanying figures in which like numerals refer to like elements, and in which.

DETAILED DESCRIPTION OF THE DISCLOSURE

The present disclosure provides a method for identifying gas in a geological formation in a low-field gradient. The method typically can be employed from a device situated in a borehole penetrating the formation. The method is particularly beneficial in a low-field gradient system but the general concept applies to the high-field gradient tool as well. This method overcomes the low diffusion sensitivity associated with small gradients.

Eq. (5) indicates that the internal gradient varies within a pore space and is dependent on the curvature of the pores. For a wetting phase fluid, such as the water in reservoir rocks, the intrinsic relaxation time, $T_{2int}$, is proportional to the pore volume-to-pore-surface ratio, V/S, which, in turn, is proportional to the inverse of the curvature of the pore. Thus Eq. (5) can be rewritten as $$G_{int} = \frac{\Delta\chi \cdot B}{C \cdot \rho \cdot T_{2int}} \qquad (8)$$

where C is a pore geometric factor translating V/S to r, and ρ is the surface relaxivity. C and ρ are often combined as a single parameter, $C_\rho$, leading Eq. (8) to be rewritten as:

$$G_{int} = \frac{\Delta\chi \cdot B}{C_\rho \cdot T_{2int}}. \qquad (9)$$

Eq. (9) can be used to link the intrinsic relaxation time of a wetting fluid saturating the porous media with the internal gradient associated with the fluid in the pore space. Since internal gradient $G_{int}$ is inversely proportional to $T_{2int}$, its effect diminishes quickly as $T_{2int}$ increases (or equivalently, as pore size increases). Since a small $T_{2int}$ signal is present only in the initial part of the echo train decay, a method that reduces the internal gradient effect in the initial part of the echo train eliminates the primary source of the decay uncertainty induced by $G_{int}$.

A suitable sequence that serves this purpose uses a dual-step TE pulse sequence. In this sequence, the first $n_S$ echoes are acquired using a pulse sequence having a short TE, often referred to as $TE_S$. Typically the shortest possible TE obtainable by the NMR instrument is used. The first $n_S$ echoes are followed by $n_L$ echoes obtained using a pulse sequence having a longer TE, often referred to as $TE_L$. The number $n_S$ is chosen to substantially allow the short $T_{2int}$ components that are associated with high $G_{int}$ decay. For typical formation rocks, no more than $n_S \cdot TE_S$ is needed. Remaining $n_L$ echo trains have a long $TE_L$ because the latter part of the echo train is associated with only larger pores or non-wetting fluids, and thus the internal gradient effect is not significant during this part. Particularly, in a wetting phase fluid in a magnetic field gradient, the first and second pulse sequences may be selected to reduce the effect of the magnetic field gradient on obtained first and second echo trains.

Figure 1:
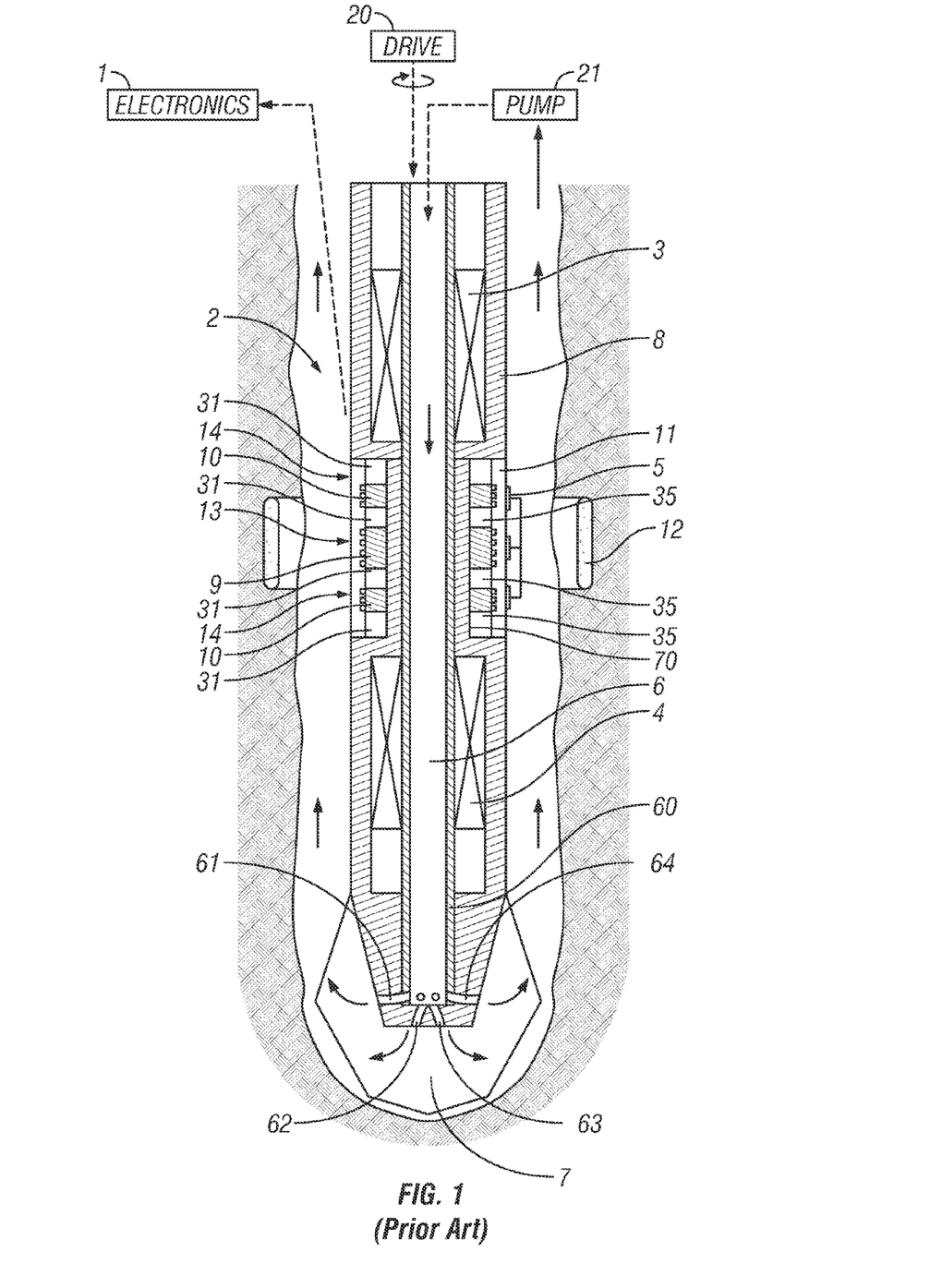
FIG. 1 (Prior Art) is a schematic cross-section of a Nuclear Magnetic Resonance (NMR) measurement-while-drilling tool in a borehole.

FIG. 1 is a schematic cross-section of a NMR measurement-while-drilling (MWD) tool in a borehole. The tool of FIG. 1 has a drill bit 7 at one end, a sensor section 2 behind the drill head, and electronics 1. The sensor section 2 comprises a magnetic field generating assembly for generating a $B_0$ magnetic field (which is substantially time invariant over the duration of a measurement), and an RF system for transmitting and receiving RF magnetic pulses and echoes. The magnetic field generating assembly comprises a pair of axially spaced main magnets 3, 4 having opposed pole orientations (i.e. with like magnetic poles facing each other), and three ferrite members 9, 10 axially arranged between the magnets 3, 4. The ferrite members are made of "soft" ferrite which can be distinguished over "hard" ferrite by the shape of the BH curve which affects both intrinsic coercivity ($H_{cj}$, the intersection with the H axis) and initial permeability ($\mu_i$, the gradient in the unmagnetized case). Soft ferrite $\mu_i$ values typically range from 10 to 10000 whereas hard ferrite has $\mu_i$ of about 1. Therefore the soft ferrite has large initial permeability (typically greater than 10, preferably greater than 1000). The RF system comprises a set of RF transmit antenna and RF receive antenna coil windings 5 arranged as a central "field forming" solenoid group 13 and a pair of outer "coupling control" solenoid groups 14.

The tool has a mud pipe 60 with a clear central bore 6 and a number of exit apertures 61-64 to carry drilling mud to the bit 7, and the main body of the tool is provided by a drill collar 8. Drilling mud is pumped down the mud pipe 60 by a pump 21 returning around the tool and the entire tool is rotated by a drive 20. Coiled tubing or a drillstring may be used for coupling the drive to the downhole assembly.

The drill collar 8 is conveyed on a drilling tubular such as a drillstring or coiled tubing (not shown) and provides a recess 70 for RF transmit antenna and RF receive antenna coil windings 5. Gaps in the pockets between the soft ferrite members are filled with non-conducting material 31, 35 (e.g. ceramic or high temperature plastic) and the RF coils 13, 14 are then wound over the soft ferrite members 9, 10. The soft ferrites 9, 10 and RF coil assembly 13, 14 are pressure impregnated with suitable high temperature, low viscosity epoxy resin (not shown) to harden the system against the effects of vibration, seal against drilling fluid at well pressure, and reduce the possibility of magnetoacoustic oscillations. The RF coils 13, 14 are then covered with wear plates 11 typically ceramic or other durable non-conducting material to protect them from the rock chippings flowing upwards past the tool in the borehole mud.

Because of the opposed magnet configuration, the device of FIG. 1 has an axisymmetric magnetic field and region of investigation 12 that is unaffected by tool rotation. Use of the ferrite results in a region of investigation that is close to the borehole. This is not a major problem on a MWD tool because there is little invasion of the formation by borehole drilling fluids prior to the logging. The region of investigation is a shell with a radial thickness of about 20 mm and an axial length of about 50 mm. The gradient within the region of investigation is less than 2.7 G/cm. It is to be noted that while these values are for the device of FIG. 1, the method of the present invention may also be used with other suitable NMR devices.

Figure 2:
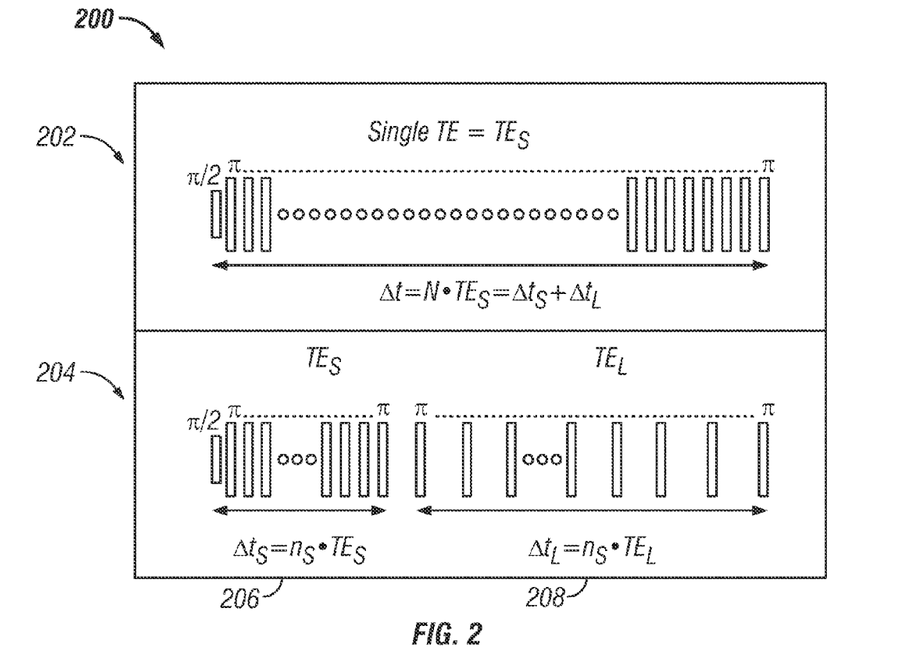
FIG. 2 illustrates an exemplary data acquisition sequence for use in gas identification using a low-gradient NMR tool.

FIG. 2 illustrates a data acquisition sequence usable in the present disclosure for gas identification using a low-gradient NMR tool. The data acquisition sequence includes two NMR pulse sequence. The first pulse sequence 202 includes a tipping pulse and at least four refocusing pulses, each refocusing pulse producing at least one corresponding spin echo signal. The interecho time for the first pulse sequence is typically a short interecho time TE ($TE_S$). Typically, $TE_S$ may correspond to the lowest TE value that can be obtained from the NMR instrument. For current NMR tools on the market, this value is typically in the range of 0.3 ms to 0.6 ms. The second pulse sequence 204 includes an earlier subset of pulses 206 immediately followed by a latter subset of pulses sequence 208, each of the earlier and latter subsets characterized by a TE value. The earlier subset of pulses 206 of the second echo train 204 includes a tipping pulse and $n_S$ refocusing pulses echoes (where $n_S \geq 4$, typically) having an interecho time TE ($TE_S$) that is the same duration as in the first pulse sequence 202. A typical duration of the earlier subset of pulses 206 is $\Delta t_S = n_S \cdot TE_S$ and is typically about 100 ms. Also, the duration may be selected to fit a criterion for obtaining data, such as for determining a parameter of interest (i.e. gas saturation). After time $\Delta t_S$, the latter subset of pulses 208 having $n_L$ refocusing pulses is applied. The latter subset of pulses 208 includes one or more refocusing pulses having a interecho TE value ($TE_L$) that is long compared with the $TE_S$ of the earlier subset of pulses 206. The $TE_L$ value is selected so that the value of $G \cdot TE_L$ is sufficient to suitably distinguish between gas and liquids based on diffusion techniques. The latter subset of pulses lasts for a duration $\Delta t_L = n_L \cdot TE_L$. $\Delta t_L$ is typically in the order of several hundreds of msec to 1 sec. The echoes formed by the earlier and latter subsets of the second echo train form a single, continuous decay curve. Although FIG. 2 shows $\Delta t = \Delta t_S + \Delta t_L$, where $\Delta t$ is the duration of the first echo train, those who are familiar with the art realize that it is not necessary that $\Delta t = \Delta t_S + \Delta t_L$.

In operation, a static magnetic field having a substantially time-invariant field is applied to a volume of an earth formation. The first pulse sequence 202 is applied to the volume, thereby inducing a first NMR signal including a first spin echo sequence in response to the refocusing pulses of first pulse sequence 202. The induced first spin echo sequence is measured. Pulse sequences 206 and 208 are applied to the volume, thereby inducing a second NMR signal including a second spin echo sequence. The second spin echo sequence is measured. A signal indicative of a parameter of gas in the volume of the formation, such as gas saturation in the formation, may be estimated from the first NMR signal and the second NMR signal. In one aspect, the estimated value may be recorded to a suitable medium.

Echoes associated with the earlier subset of pulses 206 echoes are acquired with $TE_S$ and are obtained using a high sampling rate so that the fast decay components, such as is normally associated with CBW and BVI, can be reliably determined. The slowly decaying gas component, on the other hand, experiences little reduction in amplitude at time $t = \Delta t_S$. As an example, for 100% methane at 75° C. and 3000 psi pressure, the gas $T_{2intr} \approx T_1 = 2734$ ms. Using a typical field gradient value of 2 Gauss/cm and the $TE_S = 0.6$ ms, the decay of the gas signal at $\Delta t_S = 100$ ms is less than 5%, as is shown in Eqs. (10) and (11) below:

$$T_{2app,gas} = \left( \frac{1}{2.734} + \frac{(\gamma G \cdot TE_S)^2 D}{12} \right)^{-1} = 2.23 \text{ sec} \quad (10)$$

$$E_{\Delta t_S}(TE_S) = \exp\left(-\frac{\Delta t_S}{T_{2app,gas}}\right) = \exp\left(-\frac{0.1 \text{ sec}}{2.23 \text{ sec}}\right) = 0.956, \quad (11)$$

Thus, more than 95% of the gas signal remains a t=100 ms. Even by doubling the $\Delta t_S$ to 200 ms, 91% of the gas signal remains at the end of the first group of the echo train, i.e., at t=200 ms. In contrast, for a typical BVI signal decaying at 30 ms, only 3.5% of the BVI signal is left at $\Delta t_S = 100$ ms. It is to be understood that the selection of $\Delta t_S = 100$ ms is only for exemplary purposes, and the duration $\Delta t_S$ may be selected according to a desired criterion. In one aspect, the duration of the first pulse sequence is selected such that NMR echoes related to Bound Water Volume are substantially decayed at the end of the earlier subset of pulses and NMR echoes related to estimating gas saturation are intact.

Figure 3:
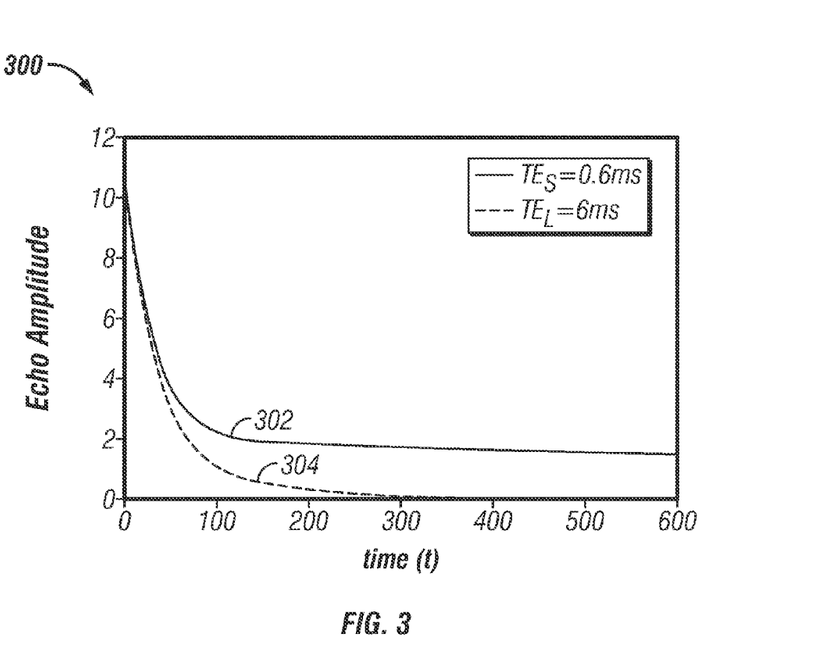
FIG. 3 illustrates echo trains obtained using two CPMG sequences having two different interecho times (TE)

FIG. 3 shows a graph 300 of two echo decay signals obtained using two straight pulse sequences having two different TEs. Curve 302 is obtained using a pulse sequence having $TE_1 = 0.6$ ms and curve 304 is obtained using and pulse sequence having $TE_2 = 6$ ms. It is apparent that the initial part of the decay is affected by the different TE used. Thus, use of two different TEs may complicate the interpretation of fast decaying components. At $n_S = 100$ ms, the gas signal is reduced by 58% for $TE_2 = 6$ ms. Since some movable water and hydrocarbon signals shift during the first 100 ms time period, separating intrinsic short relaxation components from diffusion-affected relaxation time shift can be complicated by using a straight acquisition method with $TE_2 = 6$ ms.

Referring to FIG. 2, as previously stated, the $TE_L$ value for the latter subset of pulses 208 is selected such that the combination of $G \cdot TE_L$ is sufficient so that the method of the present disclosure can be used to suitably distinguish gas from liquids based on diffusion contrast. In practice, a typical gradient from an NMR tool is substantially close to 2 Gauss/cm. TE values are selected to affect the apparent $T_2$ of gases. For example, a selected $TE_L$ value of 6 ms (8 ms) may reduce the apparent $T_2$ of methane to 116 ms (66 ms). This value is substantially different from the value 2230 ms obtained with the single $TE_S$ pulse sequence, thus enabling the use of methods for gas identification. Moreover, because the long TE echoes occur after 100 ms, the lower sampling rate of the second group does not affect those parameters which are typically determined from echoes obtained at early times, such as estimates of porosity and bound water.

In one aspect of the present disclosure, the data acquisition scheme of the present disclosure can simply be combined with the "CBW" trainlets data acquisition to enhance the CBW accuracy. It is also possible to integrate other multiple TE, multiple TW data acquisition sequences, such as described in U.S. Pat. No. 6,972,564 to Chen et al., assigned to Baker Hughes Incorporated.

A mathematical description of the echo trains of FIG. 2 is now provided. The following description assumes one hydrocarbon gas and one liquid phase fluid. However, a practitioner in the art should be able to extend the description to include multiple liquid fluid phases.

Assuming sufficient long wait time TW is used, the first echo train is described by $$M(k \cdot TE_S) = \quad (12)$$

$$HI_{gas}\left\{ \sum_i P_{i,gas} \exp\left(-\frac{k \cdot TE_S}{T_{2intr\_gas,i}}\right) \exp\left(-\frac{(\gamma GTE_S)^2 D_{gas}(k \cdot TE_S)}{12}\right) \right\} +$$

$$HI_{liquid}\left\{ \sum_i P_{i,liquid} \exp\left(-\frac{k \cdot TE_S}{T_{2intr\_liquid,i}}\right) \right.$$

$$\left. \exp\left(-\frac{(\gamma GTE_S)^2 D_{liquid}(k \cdot TE_S)}{12}\right) \right\}$$

for k=1, N where N is the total number of echoes in the first echo train.

The second echo train includes two groups of echoes, an earlier and a latter group. Eq. (13) describes the earlier group of the second echo train by $$M(k \cdot TE_S) = \quad (13)$$

$$HI_{gas}\left\{\sum_i P_{i,gas}\exp\left(-\frac{k \cdot TE_S}{T_{2intr\_gas,i}}\right)\exp\left(-\frac{(\gamma GTE_S)^2 D_{gas}(k \cdot TE_S)}{12}\right)\right\} +$$

$$HI_{liquid}\left\{\sum_i P_{i,liquid}\exp\left(-\frac{k \cdot TE_S}{T_{2intr\_liquid,i}}\right)\right.$$

$$\left.\exp\left(-\frac{(\gamma GTE_S)^2 D_{liquid}(k \cdot TE_S)}{12}\right)\right\}$$

for k=1 to $n_S$, where $n_S$ is the number of echoes in the first group. Eq. (14) describes the latter group of the second echo train:

$$M(k \cdot TE_L) = HI_{gas}\sum_i P_{i,gas}\exp\left(-\frac{(k-n_S) \cdot TE_L}{T_{2intr\_gas,i}}\right) \quad (14)$$

$$\exp\left(-\frac{(\gamma GTE_L)^2 D_{gas}((k-n_S) \cdot TE_L)}{12}\right) \times$$

$$\exp\left(-\frac{n_S \cdot TE_S}{T_{2intr\_gas,i}}\right)\exp\left(-\frac{(\gamma GTE_S)^2 D_{gas}(n_{Sx} \cdot TE_S)}{12}\right) +$$

$$HI_{liquid}\sum_i P_{i,liquid}\exp\left(-\frac{(k-n_S) \cdot TE_L}{T_{2intr\_liquid,i}}\right)$$

$$\exp\left(-\frac{(\gamma GTE_S)^2 D_{liquid}((k-n_S) \cdot TE_L)}{12}\right) \times$$

$$\exp\left(-\frac{n_S \cdot TE_S}{T_{2intr\_liquid,i}}\right)\exp\left(-\frac{(\gamma GTE_S)^2 D_{liquid}(n_S \cdot TE_S)}{12}\right)$$

for k=$n_S$+1 to $n_S$+$n_L$, where $n_L$ is the number of echoes in the latter group of the second echo train.

The earlier group of the second echo train (Eq. (13)) is identical to the first $n_S$ echoes of the first echo train (Eq. (14)), as evident in the echo trains of FIG. 4 for t<100 msec. Thus, the first $n_S$ echoes of both the echo trains can be averaged to improve the BVI estimation when both the echo trains are processed separately.

Alternatively, the two echo trains can be processed together using programs such as SIMET, as discussed in U.S. patent application Ser. No. 11/689,887, or by 2D NMR using a model identical or substantially similar to that described in Eqs. (12)-(14). The echo trains can also be processed separately as apparent $T_2$ spectra. When apparent $T_2$ distribution is sought, the latter group of the second echo train is inverted separately, since the combined echo train does not satisfy multiexponential decay. However, the apparent $T_2$ distribution for the latter group of the second echo train fits to a multiexponential model of $$M(k, TE_L) = \sum_i P'_i\exp\left(-\frac{(k-n_S) \cdot TE_L}{T_{2,i}}\right) \quad (15)$$

for k=$n_S$+1 to $n_S$+$n_L$ and where $P'_i \neq P_i$.

If the two echo trains are inverted separately, besides stacking the earlier echoes of the echo trains, the Clay-bound water (CBW) and bound volume irreducible (BVI) portion of the $T_2$ distribution can be used to forward-model the echo response which can consequently be subtracted from the latter echoes of the second echo train. The echo trains remaining from the subtraction can then be inverted. An advantage of using the forward-modeling-subtraction approach is that the remaining echo train can be inverted using a smaller $T_2$ bin range. This is the inverse of what is described in U.S. Pat. No. 6,069,477 to Chen et al., having the same assignee as the present disclosure, and wherein the later portion of an echo train is used to correct the earlier portion of an echo train. In the present disclosure, the data can be interpreted in the $T_2$ domain by observing the shift of the signal. In general, large diffusivity causes more shifts in gas signals than in signals from water and oil.

Figure 4:
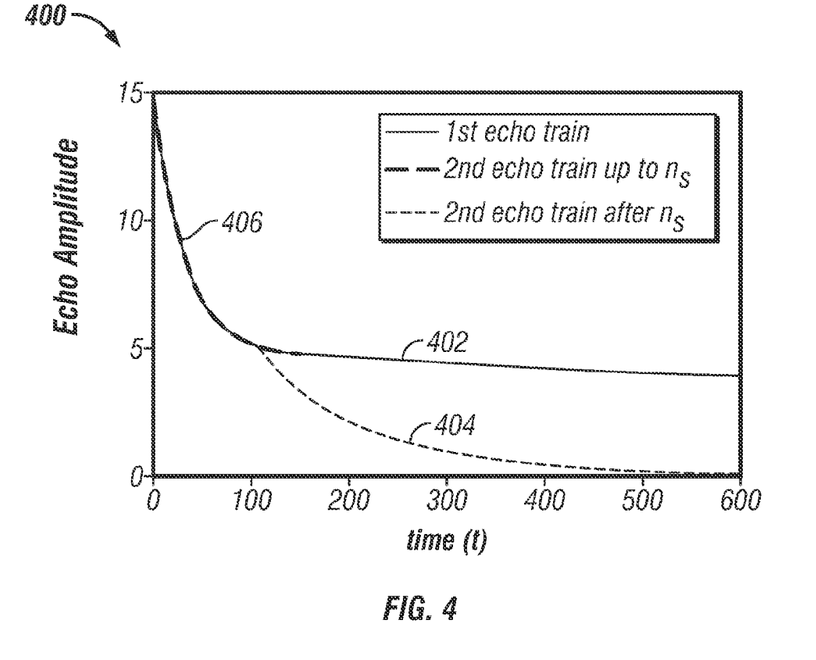
FIG. 4 illustrates a set of echo trains obtained using the data acquisition sequence of FIG. 2.

FIG. 4 illustrates a set of echo trains obtained using the data acquisition sequence of FIG. 2, using the following parameters: G=2 Gauss/cm, $TE_S$=0.6 ms, $TE_L$=6 ms. A sample having 10 pu of BVI water and 5 pu of gas (HI=1 equivalent) was examined. Curve 402 indicates the signal obtained using either pulse sequence (202, 204) prior to $\Delta t_S$. Curve 404 indicates the signal obtained by continued use of the pulse sequence 202, while curve 406 indicates the signal obtained using the second pulse sequence 204.

Figure 5:
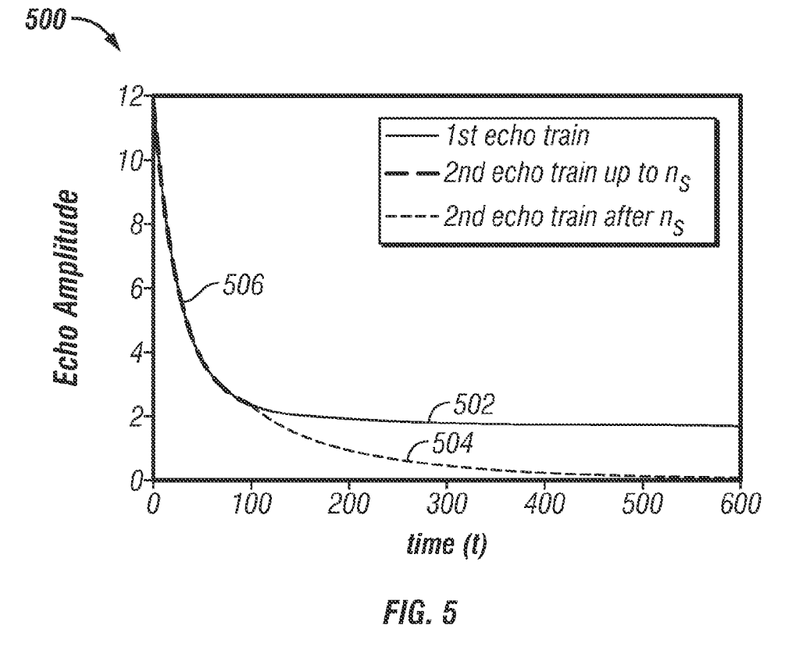
FIG. 5 illustrates another set of echo trains obtained using the data acquisition sequence of FIG. 2.

FIG. 5 illustrates another set of echo trains obtained using the data acquisition sequence of FIG. 2, using the following parameters: G=2 Gauss/cm, $TE_S$=0.6 ms, $TE_L$=6 ms. A sample having 10 pu of BVI water and 2 pu of gas (HI=1 equivalent) was examined. Curve 502 indicates the signal obtained using either pulse sequence (202, 204) prior to $\Delta t_S$. Curve 504 indicates the signal obtained by continued use of the first pulse sequence 202, while curve 506 indicates the signal obtained using the second pulse sequence 204.

With either method of processing, the end result is a $T_2$ distribution from which a gas saturation of the formation can be determined, along with the BVI and CBW The present disclosure has been made with reference to a logging tool on a bottomhole assembly conveyed on a drilling tubular. The NMR tool has an "opposed magnet" configuration and has a low magnetic field gradient. The method is equally applicable on a gradient NMR tool that is part of a string of logging instruments and conveyed on a wireline. For the purposes of the present disclosure, the term "downhole assembly" may be used to describe the BHA and the string of logging instruments. An exemplary instrument suitable for wireline use is described, for example, in U.S. Pat. No. 6,348,792 to Beard et al., U.S. Pat. No. 6,445,180 to Reiderman et al., U.S. Pat. No. 6,452,388 to Reiderman et al., all having the same assignee as the present disclosure. An important feature of the NMR logging tool is that the static magnetic field decays with distance from the borehole, so that the low gradient requirement may be met at large distances from the borehole and at lower frequencies.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation properties may be recorded on a suitable medium and used for subsequent processing upon retrieval of the BHA. The determined formation properties may also be telemetered uphole for storage, display and analysis.

The invention claimed is:

1. A method of determining a parameter of interest of a gas in a volume of an earth formation penetrated by a borehole, the method comprising:

pulsing an NMR logging tool in the borehole with a first pulse sequence comprising a tipping pulse and a plurality of refocusing pulses spaced apart by a time interval $TE_s$ to obtain a first echo train;

pulsing the NMR logging tool with a second pulse sequence comprising a tipping pulse and a plurality of refocusing pulses, an earlier subset of the plurality of refocusing pulses spaced apart by $TE_S$ and a latter subset of the refocusing pulses spaced apart by $TE_L$, wherein $TE_L>TE_S$, to obtain a second echo train; and processing the first echo train and the second echo train to estimate a value of a gas saturation of the formation.

2. The method of claim 1, further comprising obtaining the first and second NMR echo trains from a region of low magnetic field gradient in the formation.

3. The method of claim 1, wherein the first and second echo trains are obtained from a wetting phase fluid in a magnetic field gradient, further comprising selecting the first and second pulses sequences to reduce an effect of the magnetic field gradient on the obtained first and second echo trains.

4. The method of claim 1, wherein a value of $G \cdot TE_L$ is selected to enable distinguishing gas from liquids based on diffusion techniques, where G is a field gradient of an applied magnetic field.

5. The method of claim 1, wherein the first pulse sequence has a duration selected such that echoes related to Bound Water Volume are substantially decayed at the end of the first pulse sequence and echoes related to gas saturation are intact.

6. The method of claim 1 further comprising averaging the earlier subset of the second echo train and a portion of the first echo train corresponding to the earlier subset of the second echo train.

7. The method of claim 1, further comprising:
  (i) inverting the first echo train to obtain a $T_2$ distribution,
  (ii) using a portion of the obtained $T_2$ distribution to simulate a third echo train having a length substantially equal to the subset of the second echo train,
  (iii) subtracting the third echo train from the second echo train, and
  (iv) inverting the results of the subtraction to provide an estimate of a $T_2$ distribution of the gas.

8. The method of claim 1 further comprising conveying the NMR logging tool into the borehole on one of: (i) a bottomhole assembly conveyed on a drillstring, and (ii) a logging string conveyed on a wireline.

9. The method of claim 1 wherein at least one of the refocusing pulses has a tipping angle of less than 180°.

10. An NMR logging tool conveyed in a borehole penetrating an earth formation for determining a parameter of interest of a gas in a volume of the earth formation, comprising:
  (a) an antenna configured to provide a first pulse sequence comprising a tipping pulse and a plurality of refocusing pulses spaced apart by a time interval $TE_S$ to obtain a first echo train and a second pulse sequence comprising a tipping pulse and a plurality of refocusing pulses, an earlier subset of the plurality of refocusing pulses spaced apart by $TE_S$ and a latter subset of the refocusing pulses spaced apart by $TE_L$, wherein $TE_L>TE_S$, to obtain a second echo train;
  (b) a receiver configured to measure the first and second echo trains; and
  (c) a processor configured to:
    estimate from the first echo train and the second echo train a value of a gas saturation of the formation.

11. The NMR logging tool of claim 10, wherein the receiver is further configured to obtain the first and second NMR echo trains from a region of low magnetic field gradient in the formation.

12. The NMR logging tool of claim 11, wherein the receiver is further configured to obtain the first and second echo trains from one of: (i) a region near the borehole using a low-gradient NMR tool, and (ii) a region far from the borehole using a high-gradient NMR tool.

13. The NMR logging tool of claim 10, wherein the first and second echo trains are measured from a wetting phase fluid in a magnetic field gradient, the processor further configured to select the first and second pulse sequences to reduce an effect of the magnetic field gradient on the obtained first and second echo trains.

14. The NMR logging tool of claim 10, wherein the processor is further configured to select a value of $G \cdot TE_L$ that enables distinguishing gas from liquids based on diffusion techniques, where G is a field gradient of an applied magnetic field.

15. The NMR logging tool of claim 10, wherein the processor is further configured to select a duration of the first pulse sequence such that echoes related to Bound Water Volume are substantially decayed at the end of the first pulse sequence and echoes related to gas saturation are intact.

16. The NMR logging tool of claim 10, wherein the processor is further configured to average the earlier subset of the second echo train and a portion of the first echo train corresponding to the earlier subset of the second echo train.

17. The NMR logging tool of claim 10, wherein the processor is further configured to:
  (i) invert the first echo train to obtain a $T_2$ distribution,
  (ii) use a portion of the obtained $T_2$ distribution to simulate a third echo train having a length substantially equal to the subset of the second echo train,
  (iii) subtract the third echo train from the second echo train, and
  (iv) invert the results of the subtraction to provide an estimate of a $T_2$ distribution of the gas.

18. The NMR logging tool of claim 10, wherein the NMR logging tool is configured to be conveyed into the borehole on one of: (i) a bottomhole assembly conveyed on a drillstring, and (ii) a logging string conveyed on a wireline.

19. The NMR logging tool of claim 10, wherein at least one of the refocusing pulses has a tipping angle of less than 180°.

20. A computer-readable medium product having stored thereon instructions that, when executed by at least one processor, perform a method, the method comprising:
  estimating a value of a gas saturation of the earth formation based on (i) a first echo train obtained using a first pulse sequence comprising a tipping pulse and a plurality of refocusing pulses spaced apart by a time interval $TE_S$, and (ii) a second echo train obtained using a second pulse sequence comprising a tipping pulse and a plurality of refocusing pulses, an earlier subset of the plurality of refocusing pulses spaced apart by $TE_S$ and a latter subset of the refocusing pulses spaced apart by $TE_L$, wherein $TE_L>TE_S$.

21. The computer-readable medium product of claim 20 further comprising at least one of (i) a ROM, (ii) a CD-ROM, (iii) an EPROM, (iv) an EAROM, (v) a flash memory, and (vi) an optical disk.

* * * * *